US008281991B2

(12) United States Patent
Wentker et al.

(10) Patent No.: US 8,281,991 B2
(45) Date of Patent: Oct. 9, 2012

(54) TRANSACTION SECURED IN AN UNTRUSTED ENVIRONMENT

(75) Inventors: David Wentker, San Francisco, CA (US); Gabriel Wachob, San Carlos, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 490 days.

(21) Appl. No.: 12/537,020

(22) Filed: Aug. 6, 2009

(65) Prior Publication Data

US 2010/0065629 A1 Mar. 18, 2010

Related U.S. Application Data

(60) Provisional application No. 61/087,106, filed on Aug. 7, 2008.

(51) Int. Cl.
*G06K 5/00* (2006.01)
(52) U.S. Cl. ............ 235/382; 235/379; 705/39; 705/40; 705/66; 705/69
(58) Field of Classification Search .................. 235/379, 235/382; 705/39, 40, 66, 69
See application file for complete search history.

(56) References Cited

U.S. PATENT DOCUMENTS

| 7,103,575 | B1* | 9/2006 | Linehan ........................ 705/64 |
| 2003/0061167 | A1 | 3/2003 | Mann, III et al. |
| 2003/0080183 | A1 | 5/2003 | Rajasekaran et al. |
| 2005/0192893 | A1* | 9/2005 | Keeling et al. ................. 705/39 |
| 2005/0246290 | A1 | 11/2005 | Kausik |
| 2006/0020798 | A1 | 1/2006 | Lai et al. |
| 2008/0243702 | A1* | 10/2008 | Hart et al. ....................... 705/66 |
| 2009/0024943 | A1* | 1/2009 | Adler et al. .................... 715/764 |
| 2009/0094380 | A1* | 4/2009 | Qiu et al. ...................... 709/239 |
| 2009/0106823 | A1* | 4/2009 | Durski ............................ 726/4 |

* cited by examiner

*Primary Examiner* — Allyson Trail
(74) *Attorney, Agent, or Firm* — Kilpatrick, Townsend & Stockton LLP

(57) ABSTRACT

To secure communications in an untrusted environment for a commercial transaction on an account between the account's holder and a merchant, an identifier and a signature can be derived from a token. The identifier is associated by use of a directory with an application context that identifies the account's issuer. The merchant will provide the signature to the account's issuer, or agent thereof, to be verified. In practice, a merchant to the identified issuer of an account an authorization request message for a transaction that includes a signature and an identifier for the account upon which the transaction is to be conducted. The account's issuer responds with an authorization response message that includes an indicator that the signature has been verified. After notice of the signature's verification, the transaction on the account is deemed authorized and the merchant can proceed.

20 Claims, 11 Drawing Sheets

TRANSACTION SECURED IN AN UNTRUSTED ENVIRONMENT

CROSS-REFERENCE TO RELATED APPLICATIONS

This application claims priority to U.S. Provisional Application Ser. No. 61/087,106, filed on Aug. 7, 2008, titled Transaction Securing In An Untrusted Environment, which is incorporated herein by reference.

FIELD

The invention is related to a payment processing system in which a transaction between a merchant and a consumer is conducted on an account issued by an issuer, where the transaction is acquired from the merchant by an acquirer for collection on the account from the issuer through a transaction handler or transaction processor.

BACKGROUND

Individuals are often involved in interactions in which there is a need to provide some kind of identifying information to another party. Transactions, such as credit transactions, debit transactions, loyalty card transactions and the like, rely on message and data exchanges between participants (e.g., members, merchants, associations and cardholders). Traditionally, many such interactions have been performed face-to-face or over private networks using proprietary protocols, reducing the likelihood that transactions will be compromised or that an identity will be falsified.

The Internet, mobile communications networks, interactive television networks, and new access devices have created convenience for performing transactions. The number of such electronic commerce transactions continues to grow as a result. In concert with this growth trend, the threat from fraud by compromising the transaction or through falsification of identity over the Internet or in conjunction with such new access devices is likely to increase as well.

Prior to the Internet and the introduction of other remote networking technologies, some exchanges of information between information providers and information requestors, for example the exchange of information between a merchant and an issuer of a transaction card (such as a credit card, debit card, smart card, stored value card, loyalty card, and the like), occurred solely over private networks. Although current e-commerce transactions perform a majority of the messaging associated with the transaction via trusted networks, such as between the merchant and the issuer (e.g., a member) or the acquirer (e.g., an association), typically at least some portion of the messaging must occur outside of the trusted environment raising the potential that the transaction data will be compromised. With the increasingly wide-spread use of the Internet and of non-traditional devices (e.g., mobile phones, PDAs, vending machines, set-top boxes, and the like) to conduct transactions there is a concomitant increase in messaging outside of the trusted environment. This raises the potential threat of the transaction data being compromised and used in an unauthorized fashion in either the current or subsequent transactions.

Fraudulent transactions have a monetary impact on issuers and associations. Such transactions can result from, for example, skimmed transaction card data or stolen transaction cards. Today, the threat posed by skimmed card data far exceeds the threat posed by stolen cards. In the case of a stolen transaction card, a cardholder generally recognizes when a transaction card has been stolen since the cardholder no longer has the physical card. When the cardholder next attempts to use the transaction card, he will discover that the transaction card is missing and will likely contact the issuer to cancel the transaction card. In contrast, when data is skimmed from a transaction card, the cardholder has no visible sign that the transaction card has been compromised. In fact, unless the issuer determines that transaction activity stemming from the transaction card is abnormal, the cardholder will possibly not recognize that the transaction card is compromised until the next statement is received. Accordingly, the monetary impact caused by skimming card data is fairly estimated to be significantly larger than the monetary impact caused by theft of a physical card.

Additionally, other types of private information are increasingly exchanged in untrusted environments such as the Internet. Much of this information could be fraudulently used if intercepted by someone taking advantage of an insecure network to falsify an identity or to intercept an unsecured communication.

The majority of current verification methods have been designed to rely upon the existence of trusted networks to reduce the ease of skimming card data. For example, password-based or Personal Identification Number (PIN) based systems have been implemented to reduce the likelihood of unauthorized use of a transaction card. However, password or PIN information may be skimmed during a transaction.

Alternatively a static or dynamic card authentication verification value (CVV) may be used to protect the transaction in a trusted environment. A static CVV may have the same problems as a password or PIN-based system in that the CVV may be skimmed.

A transaction including a dynamic CVV resists the effects of skimming because the CVV is unique to the transaction. Accordingly, skimming a CVV from one transaction will not permit a skimmer from using the CVV in a separate transaction. Presently, however, a dynamic CVV can only be transmitted when a card is physically swiped or brought within the proximity of a contactless reader.

As a result, current transaction devices, such as credit cards, debit cards, smart cards, stored value cards, loyalty cards and the like, are designed to be used most effectively in trusted acceptance environments. In a trusted acceptance environment, the transmitted information is assumed to be valid because skimming attacks are unlikely to occur.

However, in some transactions, such as for e-commerce transactions or transactions with non-traditional devices, the connection between a merchant and a cardholder can be untrusted, insecure, and/or compromised. Accordingly, it is not the case that the entire transaction is guaranteed to be secure and uncompromised. As the number of such transactions rises, the need to secure such untrusted channels becomes more prevalent. As such, what is needed is a system and method for securing transactions in an untrusted environment.

A need exists for a system and method for providing a protection mechanism that provides security for an information exchange transaction between an information provider and an information requester in an untrusted environment.

A further need exists for a system and method for authenticating identity to permit an information exchange transaction to proceed in an untrusted environment.

SUMMARY

In an implementation, a method for securing an information exchange transaction in an untrusted environment may include the information requestor sending a message to a token to be signed, the token receiving the message and responding with an application context identifier and a public-key signature, the information requestor using the application context identifier to resolve which information provider to query for the needed information, the information requestor sending an information request and the public-key signature to the appropriate information provider, the information provider verifying the signature, and the information provider responding with the requested information.

In an implementation, rather than responding with an application context identifier, the token provides a token identifier from which the application context identifier may be derived by the information requestor.

In another implementation, an identifier corresponding to an application context and a signature are read from a token. The token corresponds to an account on which a transaction is being conducted with a merchant by an account holder of the account. Using at least the identifier corresponding to the application context, the issuer of the account is derived from a plurality of issuers. An authorization request message for the transaction is sent for delivery to the issuer of the account, where the authorization request message includes the requested signature. There is then received, from the issuer of the account in response to the authorization request message, an authorization response message that includes an indicator that the issuer of the account has verified the requested signature. After receiving the indicator that the issuer of the account has verified the requested signature, the transaction on the account can be conducted.

In yet another implementation, a merchant's Point of Service terminal (POS) sends to a client a request for a signature from a token corresponding to an account on which a transaction is being conducted at the POS with the merchant by an account holder of the account. In response to the request for the signature, the POS receives the requested signature and an identifier corresponding to an application context. The POS sends, for delivery to an entity operating an issuer directory, a query that includes the identifier corresponding to an application context. The POS receives the issuer of the account from the entity operating the issuer directory in response to the query. The POS sends, for delivery to the issuer of the account, an authorization request message for the transaction that includes the requested signature and a request for information. The POS receives, from the issuer of the account in response to the authorization request message, an authorization response message that includes an indicator that the issuer of the account has verified the requested signature and the requested information. The POS can then conduct, after receiving the indicator that the issuer of the account has verified the requested signature, the transaction on the account at the POS using at least the requested information.

In a still further implementation, first data is sent to an untrusted environment for delivery to a client. The first data includes a request for a signature from a token corresponding to an account on which a transaction is being conducted by a merchant on an account of an account holder. First one or more transmissions are received from an untrusted environment, in response to the request for the signature. The first one or more transmissions include the requested signature, a public key of the token, and a token identifier. An application context identifier is derived from at least the token identifier, and the issuer of the account is derived at least the application context identifier. Second data is sent to an untrusted environment, for delivery to the issuer of the account, wherein the second data includes an authorization request message for the transaction that includes the requested signature, the public key of the token, and a request for information. Second one or more transmissions from an untrusted environment are received from the issuer of the account in response to the authorization request message. The second one or more transmissions include an authorization response message that includes an indicator that the requested signature has been verified by using the public key of the token and the requested information. After receiving the indicator that the issuer of the account has verified the requested signature, the transaction on the account using at least the requested information can be conducted on the account of the account holder.

BRIEF DESCRIPTION OF THE DRAWINGS

Aspects, features, benefits and advantages of the implementations of the present invention will be apparent with regard to the following description, appended claims and accompanying drawings where:

DETAILED DESCRIPTION

Token authentication may be performed for transactions, such as credit card transactions, debit card transactions, smart card transactions, stored value card transactions, loyalty card transactions and the like, that are initiated in untrusted environments. Token authentication may provide security for such transactions and enable a member bank and/or a merchant to verify that transaction. Token authentication may also be used for other remote interactions which take place in an untrustworthy medium or environment.

An untrusted environment denotes an environment in which information can be received from an unknown source that may be potentially harmful (e.g., fraudulent), and thus not trustworthy. As such, trust may be thought of as a desirable attribute of a communication channel, and the means of establishing the attribute of trust will preferably not be transferred from a source to a destination using that communication channel. A trusted environment is an environment that is relied upon to a specified extent to enforce a specified security policy. As such, a trusted environment is one whose failure may break a specified security policy.

A token may be authenticated in any participating application (for example, authenticating the user for the purposes of using a particular payment card or downloading medical records corresponding to a particular patient.) The tokenholder must enable the token for use with the information provider corresponding to that particular application (for example, a payment card issuer or medical services provider).

The token may be used as a single-factor authentication device, or, in another implementation, may require a second authentication factor such as a biometric sample or a user "PIN." In an implementation, the token may comprise a biometric reader or PIN input or other device to enable a second authentication factor.

Identifiers, such as a Uniform Resource Identifier (URI) and/or an Extensible Resource Identifier (XRI) are associated with each information provider. URIs are compact strings of characters that identify abstract or physical resources on a network, and provide a common format for accessing resources using a variety of naming schemes and access methods, such as HTTP, FTP, and Internet mail.

XRIs are identifiers that build on the URI specification. The XRI specification adds an additional structural layer to generic URIs and defines a resolution scheme to make XRIs usable in a variety of contexts. XRIs may be used to identify resources (such as participants sending and receiving messages) within a platform.

In an implementation, the token may provide the identifier corresponding to a provided application context so that an information requestor can query the appropriate information provider. In another implementation, the token may provide a unique token identifier which can be used to derive the application context identifier.

Figure 1:
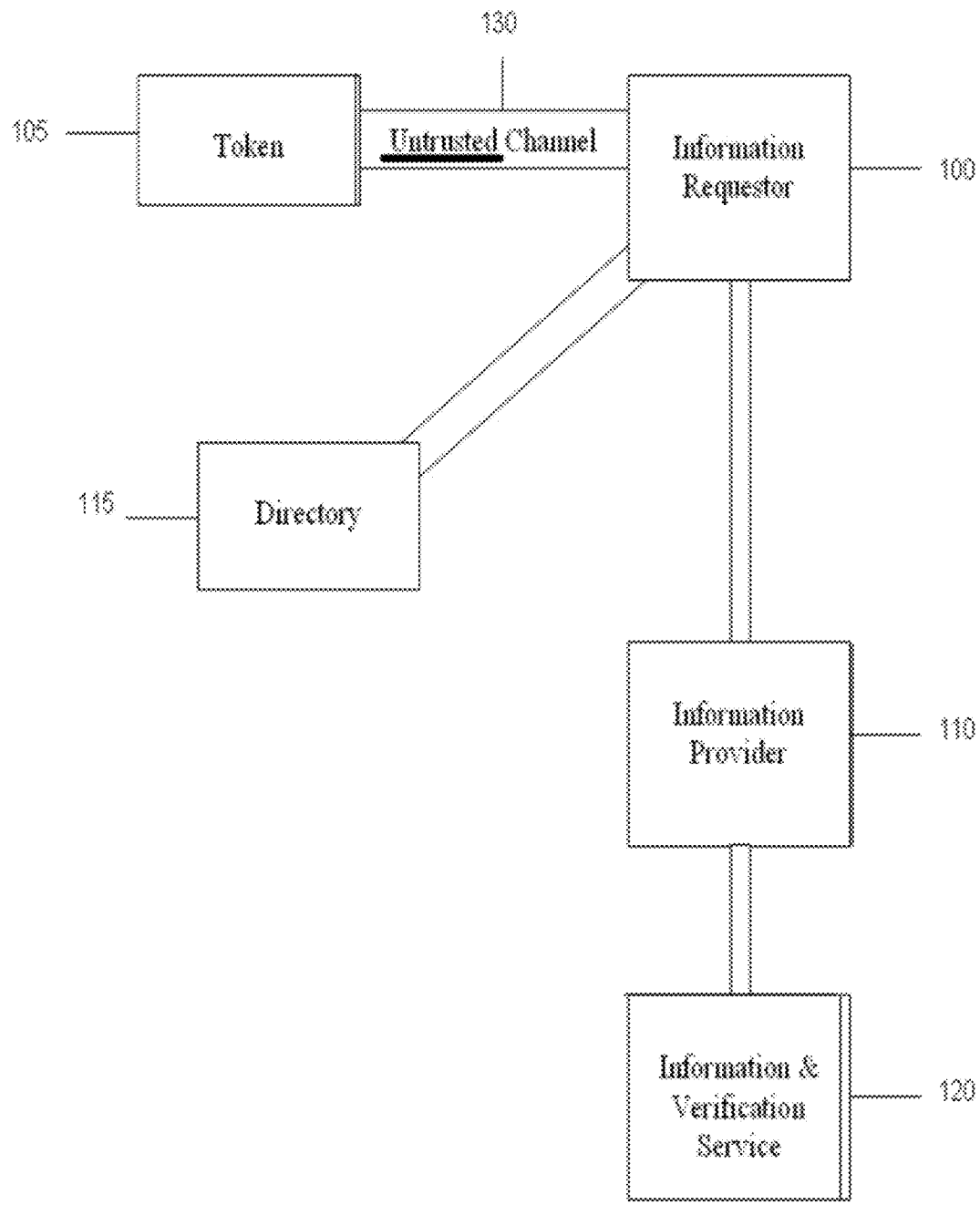
FIG. 1 depicts a layout of an exemplary transaction authentication system according to an implementation.

FIG. 1 depicts a layout of an exemplary transaction authentication system according to an implementation. As shown in FIG. 1, the exemplary system may include a token 105, an information requestor 100 (for example, a merchant), an information provider 110 (for example, a payment card issuer), an information & verification service 120, and a directory 115. The information requestor may interact with the token over an untrusted communications channel 130.

Figure 2:
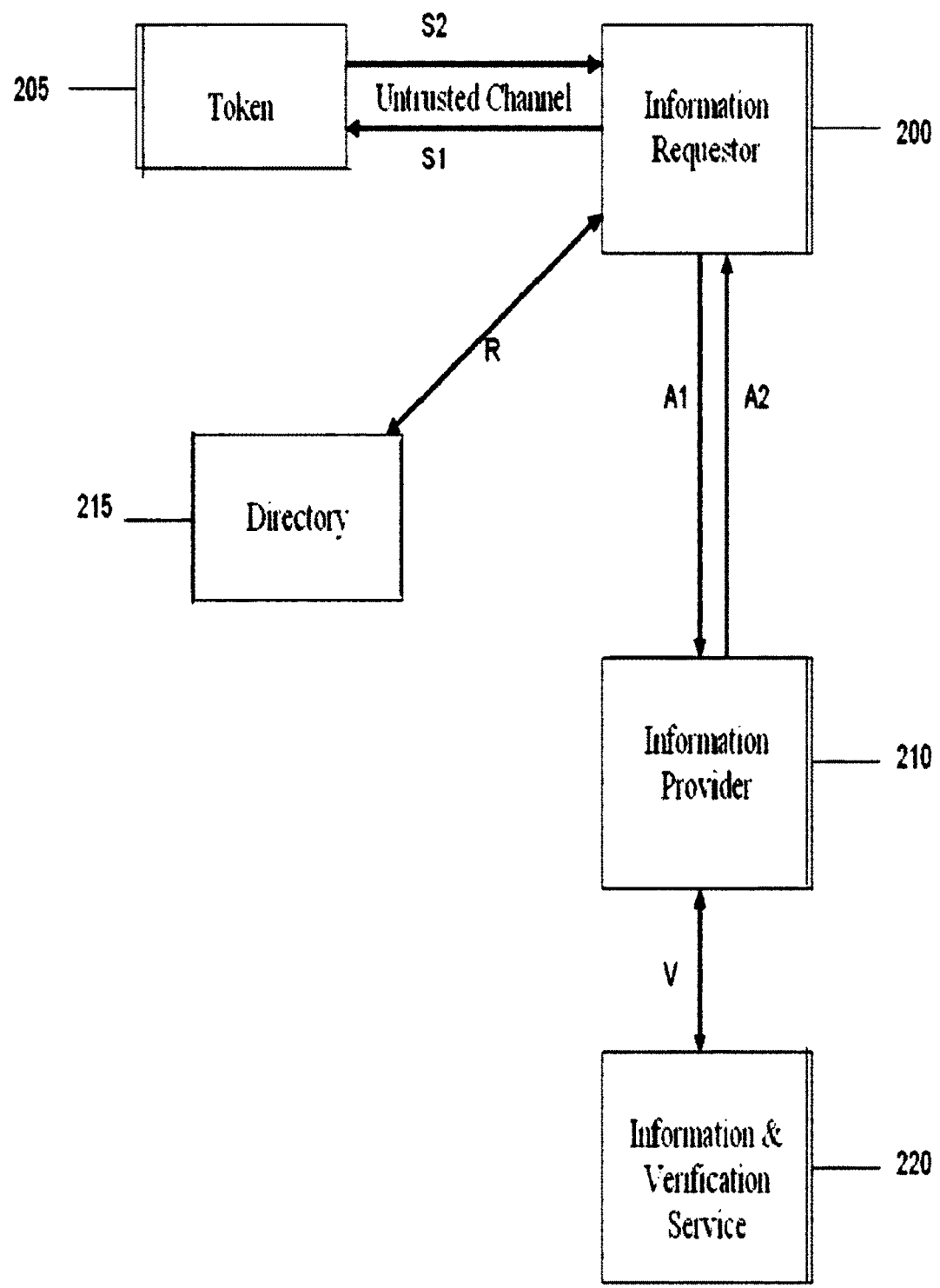
FIG. 2 depicts a flow diagram of messages passed during an exemplary transaction authentication according to an implementation.

FIG. 2 depicts a flow diagram of messages passed during an exemplary transaction authentication according to an implementation. An information requestor 200 interacts with a trustworthy token 205 to initiate a transaction. The token may take a variety of forms, including but not limited to application software residing on a smartcard or mass market device (such as a secure USB drive), a specialized single-purpose device, or software running on a user's desktop or notebook computer. The token comprises a unique token identifier and a cryptographic key assigned during the manufacturing process. Neither the unique token identifier nor the cryptographic key are modifiable, and both are specific to the token.

An information requestor 200 (for example, a merchant) may send a "signature request" S1 to the token 205. The signature request may comprise a message to be signed by the token using a public key algorithm. The token may respond S2 with an application context identifier (or a token identifier from which the application context identifier may be derived) and the requested signature.

The information requestor may use the application context identifier to resolve which of one or more information providers has the information the information requestor is seeking. The information requestor may then send an information request message A1 to the appropriate information provider 210. This message may comprise the signature. The information provider may then verify the signature. This may be done internally to the information provider, or, in another implementation, may be done by querying an information and verification service 220.

In implementations where an information and verification service is used, the verification service may validate the response and signature from the token or, alternatively, may provide the token's public key to the information provider, thus allowing the information provider to verify the signature.

In an implementation, the token supply and distribution process results in the tokens being initialized with a unique token identifier and a cryptographic key. An entry corresponding to the token may be present in a directory or database. In an implementation, the token user may register the token with a token registrar so that the token registrar may provide subsequent customer service (for example, replacing lost or stolen tokens). In this implementation, the user would provide the token registrar with credentials that the registrar would associate with the token in a database or directory.

In an implementation, the token is associated with one or more information providers. For example, a token may be linked to one or more payment card issuers, medical service providers, financial institutions, loyalty programs, etc. Each information provider may require different user credentials, depending on the application. For some applications users may be anonymous, whereas for others extensive user credentials may be required.

In an implementation, the information provider is also the token registrar, and the customer is already associated with the user when the user receives it. In another implementation, the registrar and information provider are separate entities, and the user may either provide credentials in a face-to-face context (for example, at the information provider's place of business) or remotely (for example, using the Internet).

Figure 3:
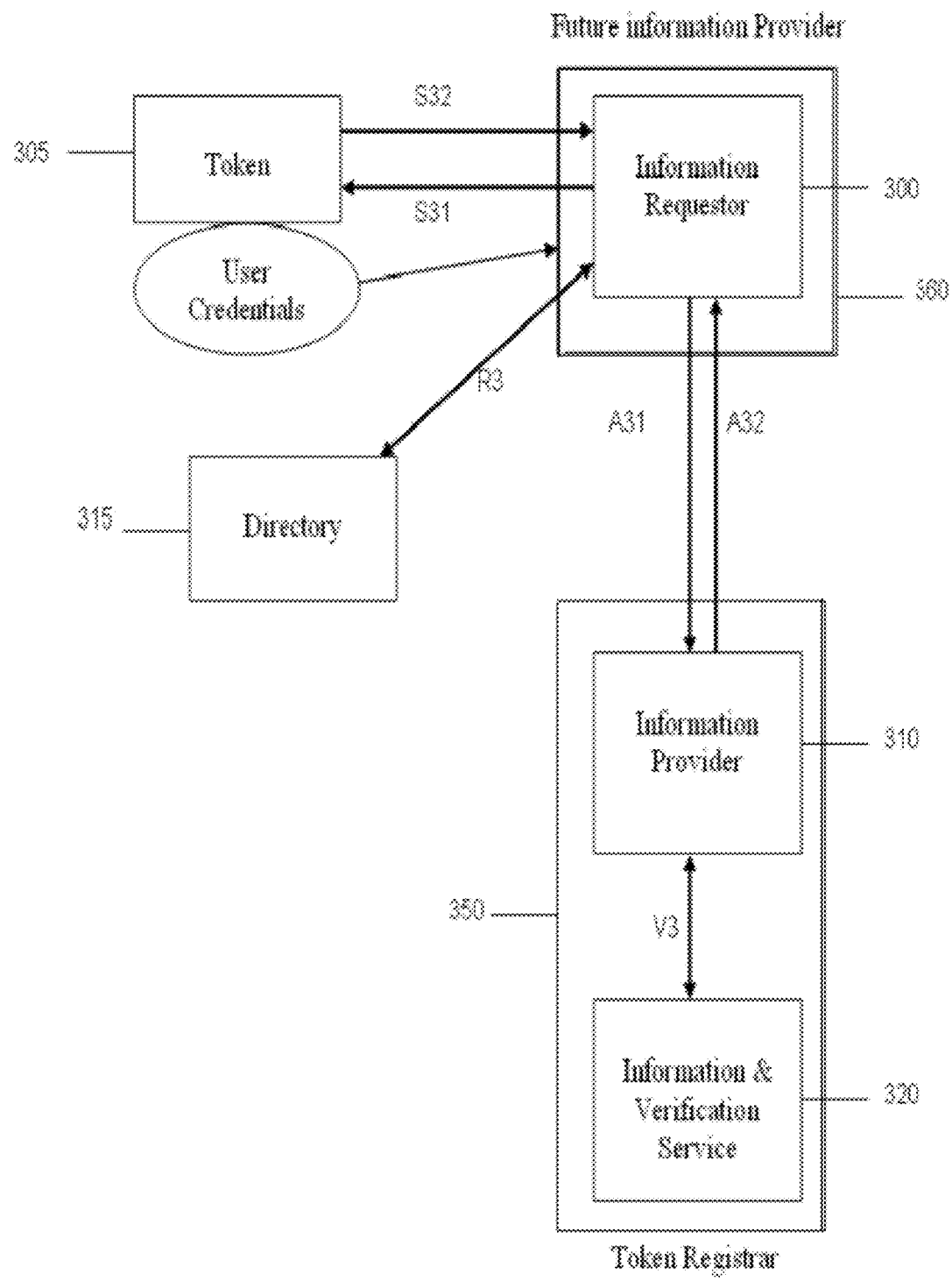
FIG. 3 depicts a flow diagram of messages passed during an exemplary application registration according to an implementation.

FIG. 3 depicts a flow diagram of messages passed during an exemplary application registration according to an implementation. A user may supply credentials to a future information provider 360 that includes an information requestor 300. Additionally or alternatively, the future information provider 360 may request S31 and receive S32 a signature from the token 305. The new information provider 360 may request A31 token information, comprising the token identifier and cryptographic keys, from the token registrar 350. In an implementation, the token information may additionally comprise metadata. In an implementation, the request A31 may include the signature provided by the token.

The token registrar 350, which includes an information provider 310 and an information and verification service 302, may verify the signature, and respond with the token information A32. In an implementation, the future information provider 360 may build a duplicate record for the token in its token information database. An entry for the token's new application context identifier (or the application context identifier derivable from the token's unique identifier) would be created in the directory 315. This entry would subsequently be used by information requestors 300 to route information requests corresponding to that application context identifier to the appropriate information provider.

Figure 4:
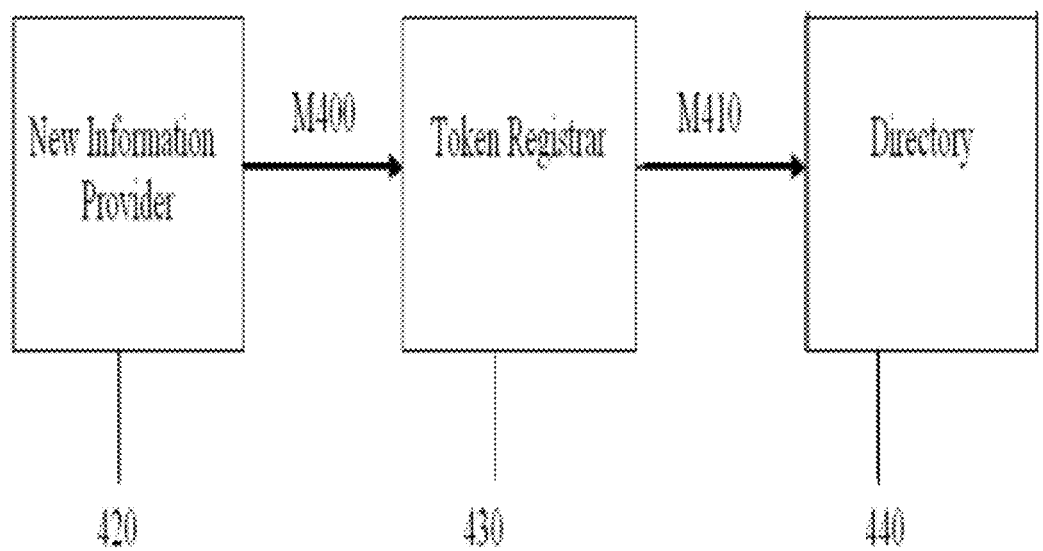
FIG. 4 depicts a flow diagram of messages passed during an exemplary application registration according to another implementation.

FIG. 4 depicts a flow diagram of messages passed during an exemplary application registration according to another implementation. A new information provider 420 may generate and send a message comprising a new application context identifier M400 to the token registrar 430. The message may additionally comprise a signature provided by the token. The token registrar may verify the signature and create or arrange M410 to be created an entry in directory 440 for the token's new application context identifier. In an implementation, the token registrar may then respond with a confirmation of the action.

Figure 5:
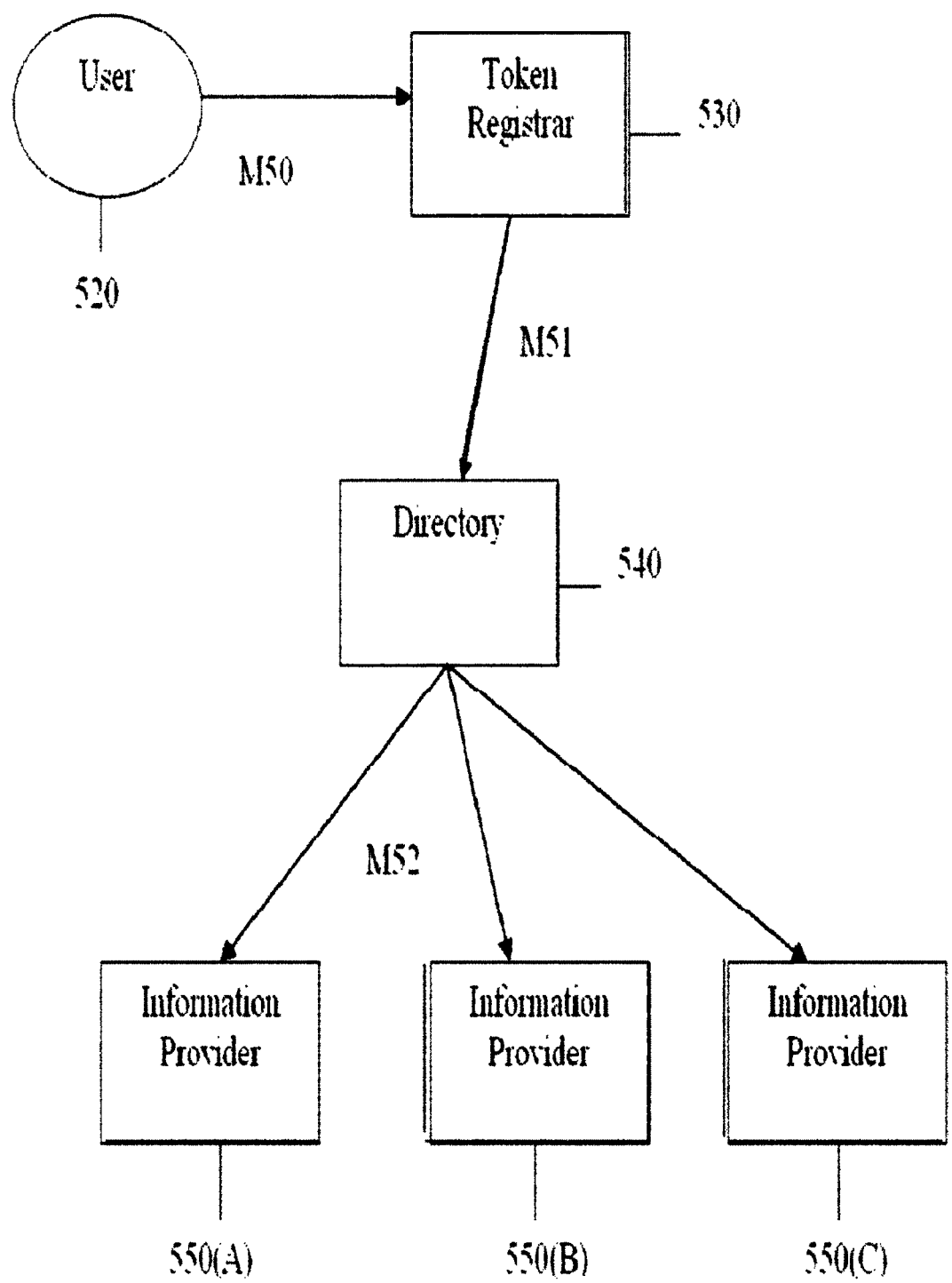
FIG. 5 depicts a flow diagram of messages passed during an exemplary token disabling procedure according to an implementation.

As tokens may be lost, stolen, or damaged, or as users may wish to stop using them, a method of disabling a token is desirable. FIG. 5 shows the message flows corresponding to an exemplary implementation of a method for allowing tokens to be disabled.

In an implementation, a token user 520 may request M50 that a token be disabled. The request may comprise the user's credentials, and may be issued to a token registrar 530. The token registrar may update M51 the directory 540 by removing or otherwise invalidating the application context identifiers corresponding to the token identifier associated with the token to be disabled. In an implementation, information providers 550(A-C) may be informed M52 of the change, by the administrator of the directory, and may remove records corresponding to the token from their own databases.

Figure 6:
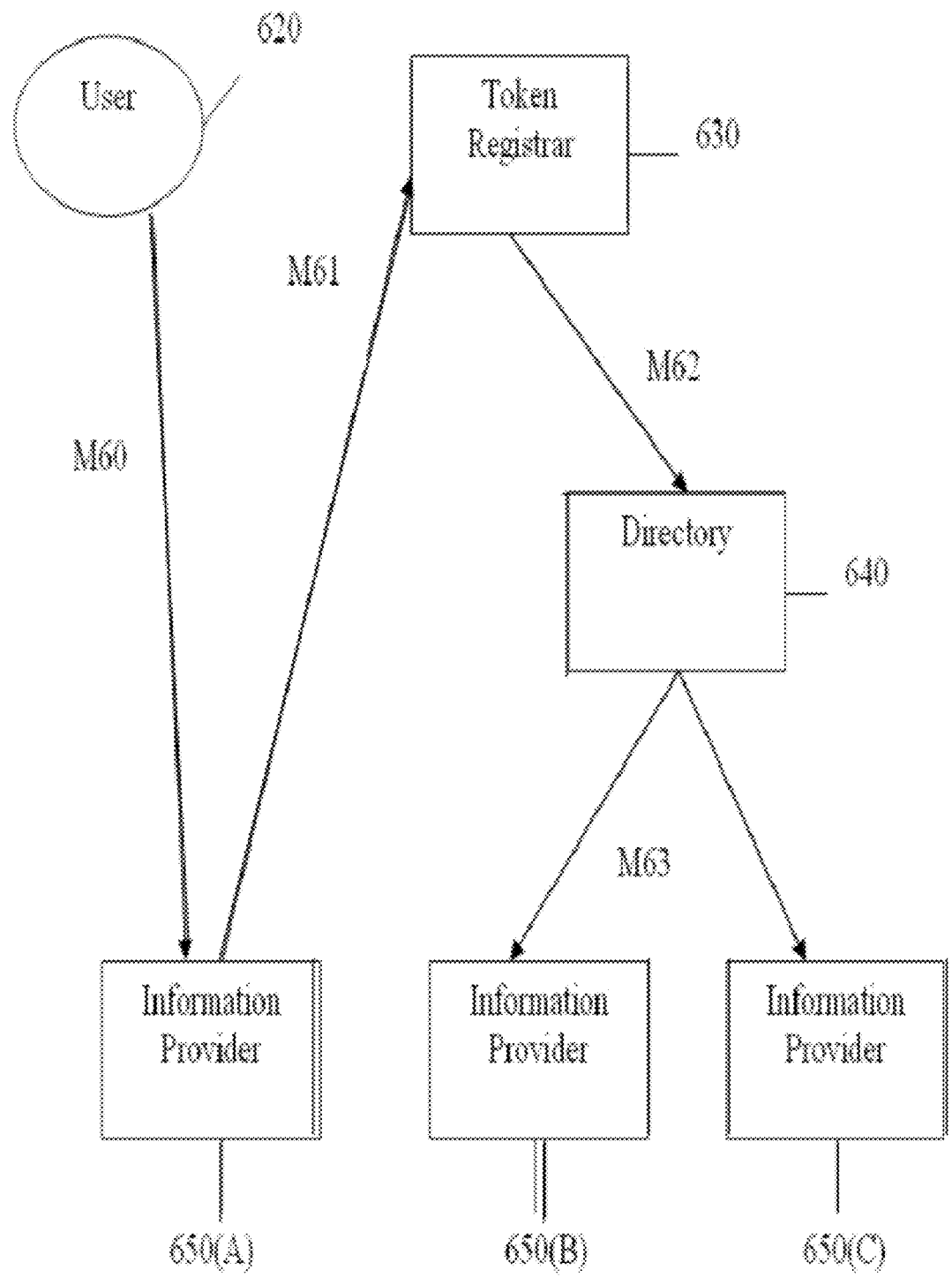
FIG. 6 depicts a flow diagram of messages passed during an exemplary token disabling procedure according to another implementation.

FIG. 6 shows message flows corresponding to another implementation of a method to disable a token. A user 620 may request M60 an information provider 650(A) to disable the token. The request may include the user's credentials. The information provider may remove records relating to the token from its own database, and may inform M61 token registrar 630 that the token is to be disabled. The token registrar may then update M62 the directory 640 by removing or otherwise invalidating application context identifiers corresponding to the token. In an implementation, information providers 650(B,C) may be informed M63 of the change, by the administrator of the directory, and may remove records corresponding to the token from their own databases.

Payment Processing System

Figure 7:
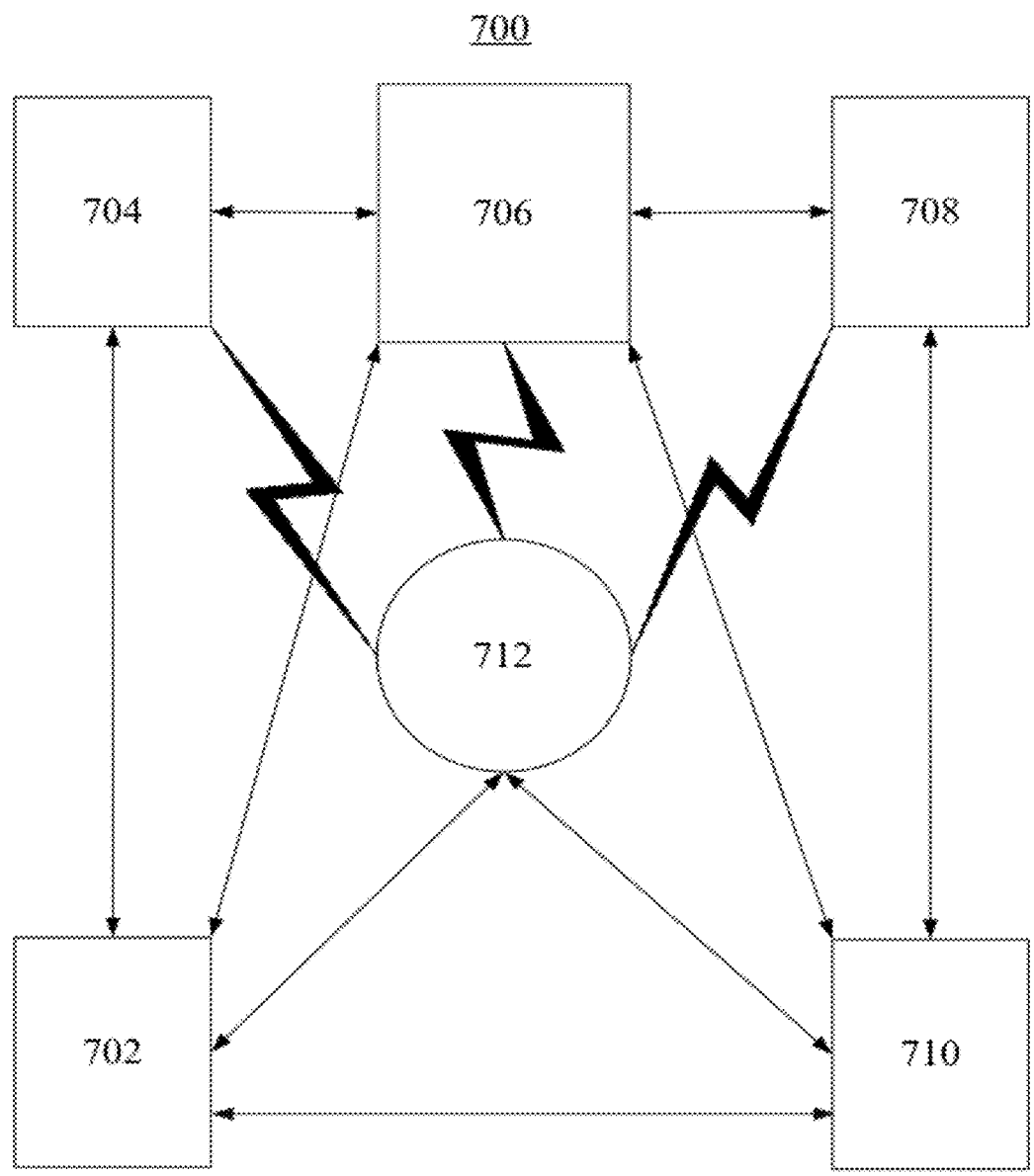
FIGS. 7-8 depicts exemplary payment processing systems for processing an acquired transaction conducted on an account issued to consumer with a merchant.

The Payment System illustrated in FIG. 7 depicts an exemplary process which can be used by the foregoing implementations with respective modifications as described therein.

A transaction includes participation from different entities that are a component of a payment processing system 700 including an issuer 702, a transaction handler 704, such as a credit card company, an acquirer 706, a merchant 708, or a user 710 such as an account holder and/or consumer. Although the acquirer 706 and the issuer 702 can communicate in a trusted environment with the transaction handler 704 through dedicated lines, each of the entities in FIG. 7 can optionally communicate through a network 712, which can be an untrusted environment. Merchant 708 will be a person or entity that sells goods or services. Merchant 708 may utilize at least one Point-of-Service (POS) terminal that can communicate with the acquirer 706, the transaction handler 704, or the issuer 702. Thus, the POS terminal is in operative communication with the payment processing system 700.

Typically, a transaction begins with the user 710, such as an account holder or a consumer, presenting a Consumer Portable Transaction Payment Device (CPTPD) to merchant 708 to initiate an exchange for a good or service. The CPTPD may include a volatile or non-volatile memory to store information such as the account number or an account holder's name.

Merchant 708 may use the POS terminal to obtain account information, such as an account number, from the portable consumer device. The CPTPD may interface with the POS terminal using a mechanism that may include a contactless system using a radio frequency and/or magnetic field recognition system, but may additionally be adapted for use in a contact system such as by a magnetic stripe reader. The POS terminal sends a transaction authorization request to the issuer 702 of the portable consumer device.

The issuer 702 may authorize the transaction using the transaction handler 704. The transaction handler 704 may also clear the transaction. Authorization includes the issuer 702, or the transaction handler 704 on behalf of the issuer 702, authorizing the transaction in connection with the issuer's 702 instructions such as through the use of business rules. The business rules could include instructions or guidelines from the transaction handler 704, the user 710, merchant 708, the acquirer 706, the issuer 702, a financial institution, or combinations thereof. The transaction handler 704 may maintain a log or history of authorized transactions. Once approved, merchant 708 will record the authorization, allowing the user 710 to receive the good or service.

Merchant 708 may, at discrete periods, such as the end of the day, submit a list of authorized transactions to the acquirer 706 or other components of the payment processing system 700. The transaction handler 704 may compare the submitted authorized transaction list with its own log of authorized transactions. If a match is found, the transaction handler 704 may route authorization transaction amount requests from the corresponding acquirer 706 to the corresponding issuer 702 involved in each transaction. Once the acquirer 706 receives the payment of the authorized transaction amount from the issuer 702, it can forward the payment to merchant 708 less any transaction costs, such as fees. If the transaction involves a debit or pre-paid card, the acquirer 706 may choose not to wait for the initial payment prior to paying the merchant 708.

There may be intermittent steps in the foregoing process, some of which may occur simultaneously. For example, the acquirer 706 can initiate the clearing and settling process, which can result in payment to the acquirer 706 for the amount of the transaction. The acquirer 706 may request from the transaction handler 704 that the transaction be cleared and settled. Clearing includes the exchange of financial information between the issuer 702 and the acquirer 706 and settlement includes the exchange of funds. The transaction handler 704 can provide services in connection with settlement of the transaction. The settlement of a transaction includes depositing an amount of the transaction settlement from a settlement house, such as a settlement bank, which the transaction handler 704 typically chooses, into a clearinghouse, such as a clearing bank, that the acquirer 706 typically chooses. The issuer 702 deposits the same from a clearinghouse, such as a clearing bank, which the issuer 702 typically chooses into the settlement house. Thus, a typical transaction involves various entities to request, authorize, and fulfill processing the transaction.

Figure 8:
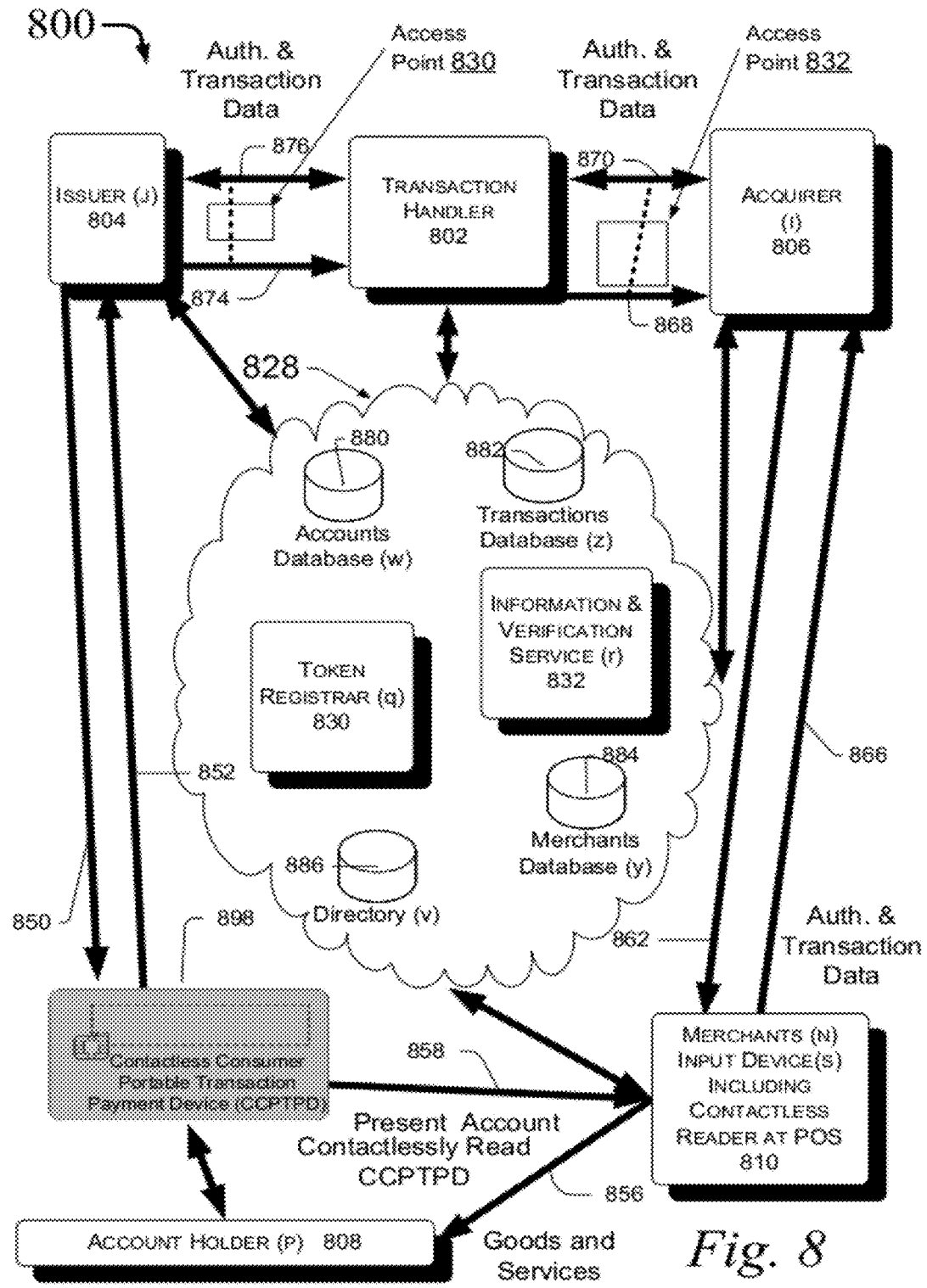

FIG. 8 depicts an exemplary process for the provision of a service by a merchant to a consumer in authorizing and remunerating electronic payment by a account holder (p) 808 in conducting a financial transaction with the merchant (i.e.; a credit card transaction). The diagram of FIG. 8 depicts an exemplary process 800 of a particular financial transaction system. By way of explanation for the nomenclature of reference numerals used in the Figures and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 804, 806, 808, 810, 880, 882, and 884 in FIG. 8 are illustrated with a block, but indicate one or more elements can be present. For example, Issuer (j) 804 is one of a possible plurality of issuers, where j may range from 1 to a large integer.

Account holder (p) 808 presents an electronic payment device (i.e.; a credit card) to a Merchant (n) 810 (at step 858) as tender for a financial transaction such as a purchase of goods. Those of skill in the art will recognize that other financial transactions and instruments other than credit cards may also be used, including, but not limited to, a prepaid card and a debit card. For purposes of illustration and explanation, however, reference will be made to a credit card.

As part of the transaction, the Account holder's 808 payment device can be a credit card, debit card, prepaid card, cellular telephone, Personal Digital Assistant (PDA), etc. The payment device is read by a reader operated by the merchant (n) 810, whereupon account information and a token are read from the payment device. The token includes an identifier corresponding to an application context and a signature token corresponding to an account on which a transaction is being conducted with merchant (m) by account holder (p) of an account in the account information.

By way of communications in an untrusted environment between merchant (m) 810 and network 828, there can be derived, using at least the identifier corresponding to the application context, the issuer (j) 804 of the account from a plurality of issuers 804. In various implementations, the derivation of issuer (j) 804 is accomplished by the use of one or more entities and facilities seen in FIG. 8, including a token registrar(q) 830, an information & verification service (r) 832, and a directory (v) 886. Note that communications to and from network 826 occur in an untrusted environment, whereas communications between transaction handler 802 and the issuers 804 over dedicated lines and between the transaction handler 802 and the acquirers 806 over dedicated lines occur in a trusted environment.

After the derivation of the issuer (j) 804, a request for authorization is transmitted to the Merchant's 810 Acquirer (i) 806 (at step 862). Each Acquirer (i) 806 is a financial organization that processes credit card transactions for businesses, for example merchants, and is licensed as a member of a transaction handler (TH) 802 such as a credit card association (i.e., Visa Inc., MasterCard, etc.) As such, each Acquirer (i) 806 establishes a financial relationship with one or more Merchants (n) 810.

The Acquirer (i) 806 transmits the account information to the TH 802 (at step 870), who in turn routes the request to the account holder's issuing bank, or Issuer (j) 804 (at step 876). The Issuer (j) 804 returns authorization information to the TH 802 (at step 874) who returns the information to the Merchant (n) 810 through the Acquirer (i) 806 (by steps 868 and 866). The Merchant (n) 810 now knowing whether the Issuer's (j) 804 credit card account is valid and supports a sufficient credit balance, may complete the transaction and the Account holder (p) 808 in turn receives goods and/or services in exchange (at step 856). Most credit card associations instruct merchants that, after receiving authorization, the detailed credit card account information obtained from the point of sale magnetic stripe scanner must be deleted.

To reconcile the financial transactions and provide for remuneration, information about the transaction is provided by the Merchant (n) 810 to Acquirer (i) 806 (at step 862), who in turn routes the transaction data to the TH 802 (at step 870) who then provides the transaction data to the appropriate Issuer (j) 804 (at step 876). The Issuer (j) 804 then provides funding for the transaction to the TH 802 (at step 874) through a settlement bank (not shown). The funds are then forwarded to the Merchant's (n) 810 Acquirer (i) 806 (at step 868) who in turn pays the Merchant (n) 810 for the transaction conducted at step 862 less a merchant discount, if applicable. The Issuer (j) 804, then bills the Account holder (p) 808 (at step 850), and the Account holder (p) 808 pays the Issuer 804 (at step 852), with possible interest or fees.

Each of the Issuer (j) 804, Merchants (n) 810, Acquirer (i) 806 and the TH 802 may have access to information resources in a network 828 that is in communication with one or more of the following databases: transaction database (z) 882, merchant database (y) 884, or account database (w) 880. These databases can be connected by one or more networks, the Internet, a virtual private network, or by other means known to those skilled in the art. Moreover, not every participant must necessarily have access to any or all of the databases. Each database can assign read, write, and query permissions as appropriate to the various participants. For example, a Merchant (n) 810 have read access to the account database (w) 880 and the Issuer (j) may have read and write access.

In communication over network 828 are one or more information and verification services 832 (r), each being capable of similar functionality to that of reference numerals 120, 220, and 320, respectively, in FIGS. 1-3. Also in communication over network 828 are one or more token registrars (q) 830, each being capable of similar functionality to that of reference numerals 350 and 430, respectively, in FIGS. 3-4. Further in communication over network 828 are one or more directories (v) 886, each being capable of similar functionality to that of reference numerals 115, 215, 315, 540 and 640 respectively, in FIGS. 1-3 and 5-6.

The transaction database (z) 882 is designed to store some or all of the transaction data originating at the Merchants (n) 810 that use a payment device for each transaction conducted between an Account holder (p) 808 and the Merchant (n) 810. The transaction data can include information associated with the account of an Account holder (p) 808, date, time, and location among other more specific information including the amount of the transaction. The database can be searched using account information, date and time (or within proximity thereof), or by any other field stored in the database.

The Merchant database (y) 884 is designed to store information about each Merchant (n) 810. The Merchant database (y) can contain information such as the unique identification of each Merchant (n) 810, an identifier for each point of sale device in use by the Merchant (n) 810, and location of the Merchant (n) 810.

The account database (w) 880 is designed to store account information for payment devices associated with Account holder (p). The account database (w) 880 can store part or all of an account number, unique encryption key, account information, account name. The information from the account database (w) 880 can be associated with information from the transaction database (z) 882.

An Account holder (p) 808 initiates a transaction with a Merchant (n) 810 by presenting a payment device at step 858 to the Merchant (n) 810. The payment device is typically presented at the Point Of Service terminal (POS) at which data thereon is read. Certain transaction information is transmitted from the POS in route to the Merchant's (n) 810 Acquirer (i) 806. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (n) 810, and the ultimate destination, such as the Acquirer (i) 806. These points can include, without limitation, from the reader at the POS, the POS at the Merchant (n) 810 and a network router or computer that is connected to a network but is housed and maintained by the Merchant (n) 810 and between the Merchant (n) 810 and the Acquirer (i) 806. The communication channel could be Ethernet, wireless internet, satellite, infrared transmission, or other known communication protocols. Some or all of the transmission may also be stored for record keeping, archival or data mining purposes with little or no encryption. For example, the Merchant (n) 810 may store transaction data, including certain account information in the Merchant's (n) 810 accounts on file database for reuse later.

In this process, transaction information is retrieved from the POS at a Merchant (n) 806. The transaction information is comprised of account information together with other information about the transaction itself: time, date, location, value, etc. Certain of the transaction information is considered sensitive information including, without limitation, account number, credit card verification number, and account name. In FIGS. 7 and 8 illustrate exemplary telecommunications networks that each may make use of any suitable telecommunications network and may involve different hardware, different software and/or different protocols then those discussed below. These global telecommunications networks supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on-line.

FIGS. 7 and 8 include one or more transaction handlers 702, 802, access points 830, 832, acquirers 706/806, and issuers 704/804. Other entities such as drawee banks and third party authorizing agents may also connect to the network through an access point. An interchange center is a data processing center that may be located anywhere in the world. In one implementation, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, the communication lines that connect an interchange center (transaction handlers 102, 304) to remote entities use dedicated high-bandwidth telephone circuits or satellite connections based on the IBM SNA-LU0 communication protocol. Messages are sent over these lines using any suitable implementation of the ISO 8583 standard.

Access points 830, 832 are typically made up of small computer systems located at a processing center that interfaces between the center's host computer and the interchange center The access point facilitates the transmission of messages and files between the host and the interchange center supporting the authorization, clearing and settlement of transaction. Telecommunication links between the acquirer (q) and its access point, and between the access point and issuer (i) 104 are typically local links within a center and use a proprietary message format as preferred by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 9:
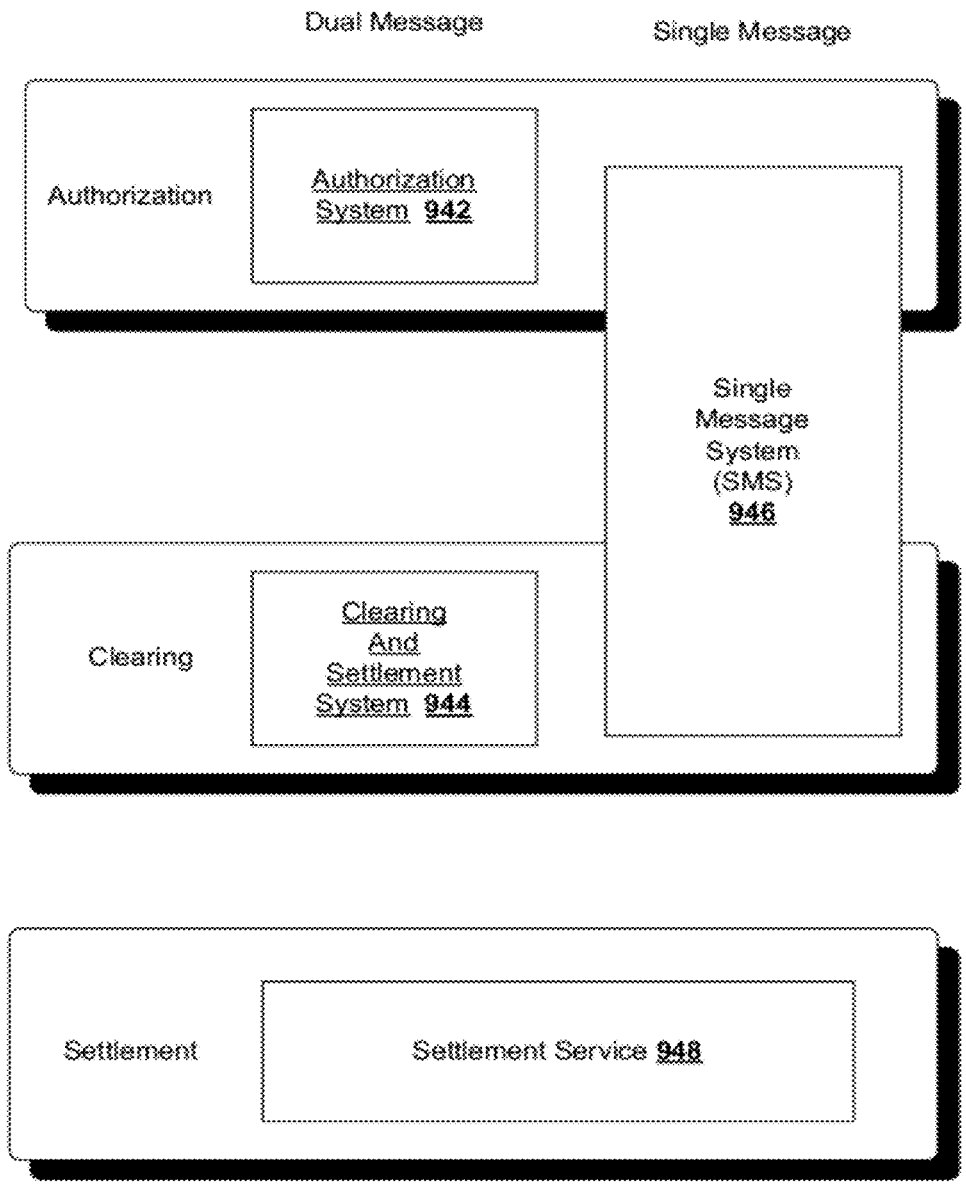
FIG. 9 illustrates systems housed within an interchange center to provide online and offline transaction processing.

FIG. 9 illustrates systems 940 housed within an interchange center to provide on-line and off-line transaction processing. For dual message transaction, authorization system 942 provides authorization. System 942 supports on-line and off-line functions, and its file includes internal systems tables, a customer database and a merchant central file. The on-line functions of system 942 support dual message authorization processing. This processing involves routing, cardholder and card verification and stand-in processing, and other functions such as file maintenance. Off-line functions including reporting, billing, and generating recovery bulletins. Reporting includes authorization reports, exception file and advice file reports, POS reports and billing reports. A bridge from system 942 to system 946 makes it possible for members using system 942 to communicate with members using system 946 and access the SMS gateways to outside networks.

Clearing and settlement system 944 clears and settles previously authorized dual message transactions. Operating six days a week on a global basis, system 944 collects financial and non-financial information and distributes reports between members It also calculates fees, charges and settlement totals and produces reports to help with reconciliation. A bridge forms an interchange between system 944 processing centers and system 946 processing centers.

Single message system 946 processes full financial transactions. System 946 can also process dual message authorization and clearing transactions, and communicates with system 942 using a bridge and accesses outside networks as required. System 946 processes Visa, Plus Interlink and other card transactions. The SMS files comprise internal system tables that control system access and processing, and the cardholder database, which contains files of cardholder data used for PIN verification and stand-in processing authorization. System 946 on-line functions perform real-time cardholder transaction processing and exception processing for authorization as well as full financial transactions. System 946 also accumulates reconciliation and settlement totals. System 946 off-line functions process settlement and funds transfer requests and provide settlement and activities reporting. Settlement service 948 consolidates the settlement functions of system 944 and 946, including Interlink, into a single service for all products and services. Clearing continues to be performed separately by system 944 and system 946.

Figure 10:
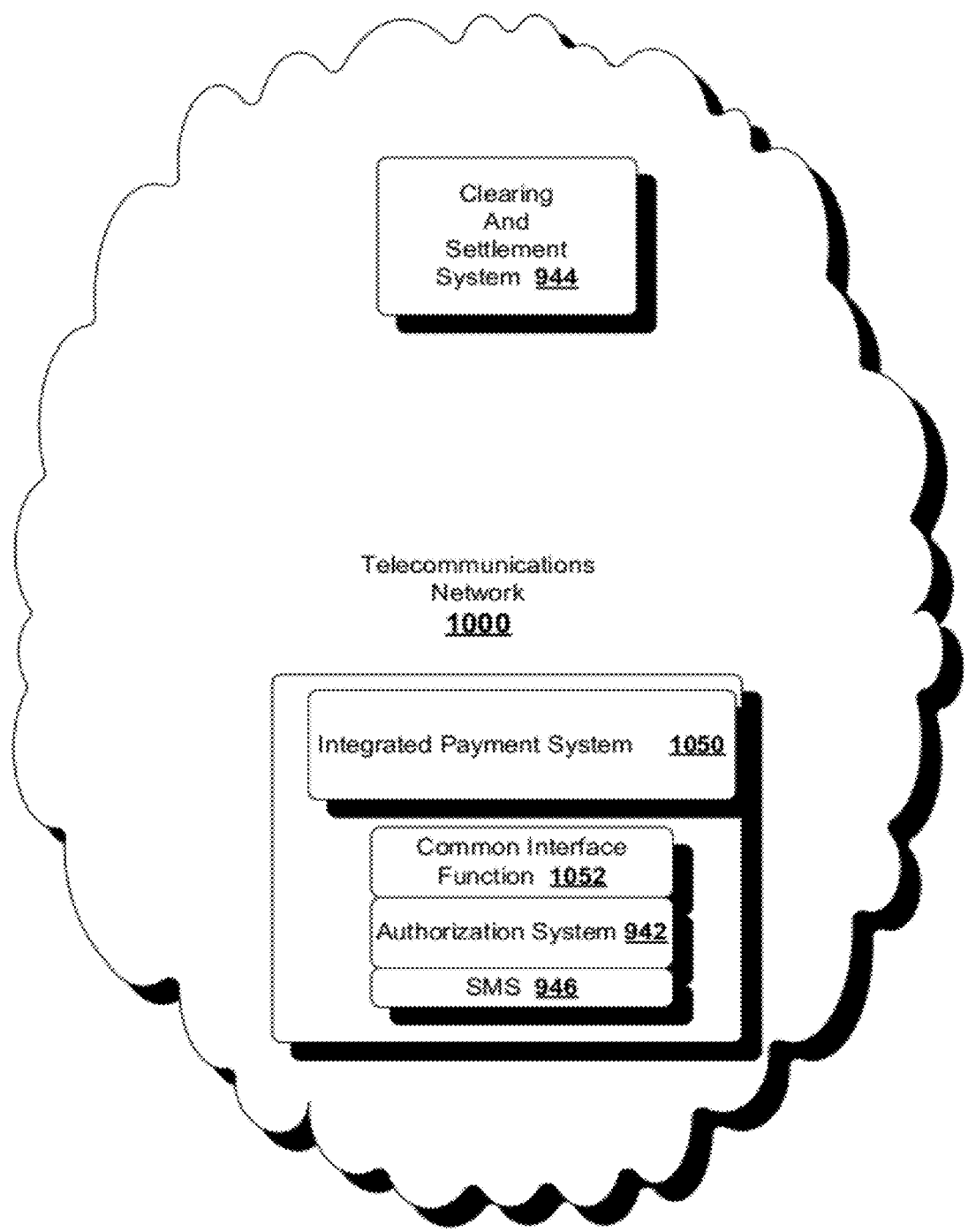
FIG. 10 illustrates another view of the components of FIG. 8.

FIG. 10 illustrates another view of components of FIGS. 1 and 3 as a telecommunications network 900. Integrated payment system 1050 is the primary system for processing all on-line authorization and financial request transactions. System 1050 reports both dual message and single message processing. In both cases, settlement occurs separately. The three main software components are the common interface function 1052, authorization system 942 and single message system 946.

Common interface function 1052 determines the processing required for each message received at an interchange center. It chooses the appropriate routing, based on the source of the message (system 942, 944 or 946), the type of processing request and the processing network. This component performs initial message editing, and, when necessary, parses the message and ensures that the content complies with basic message construction rules. Common interface function 1052 routes messages to their system 942 or system 946 destinations.

Figure 11:
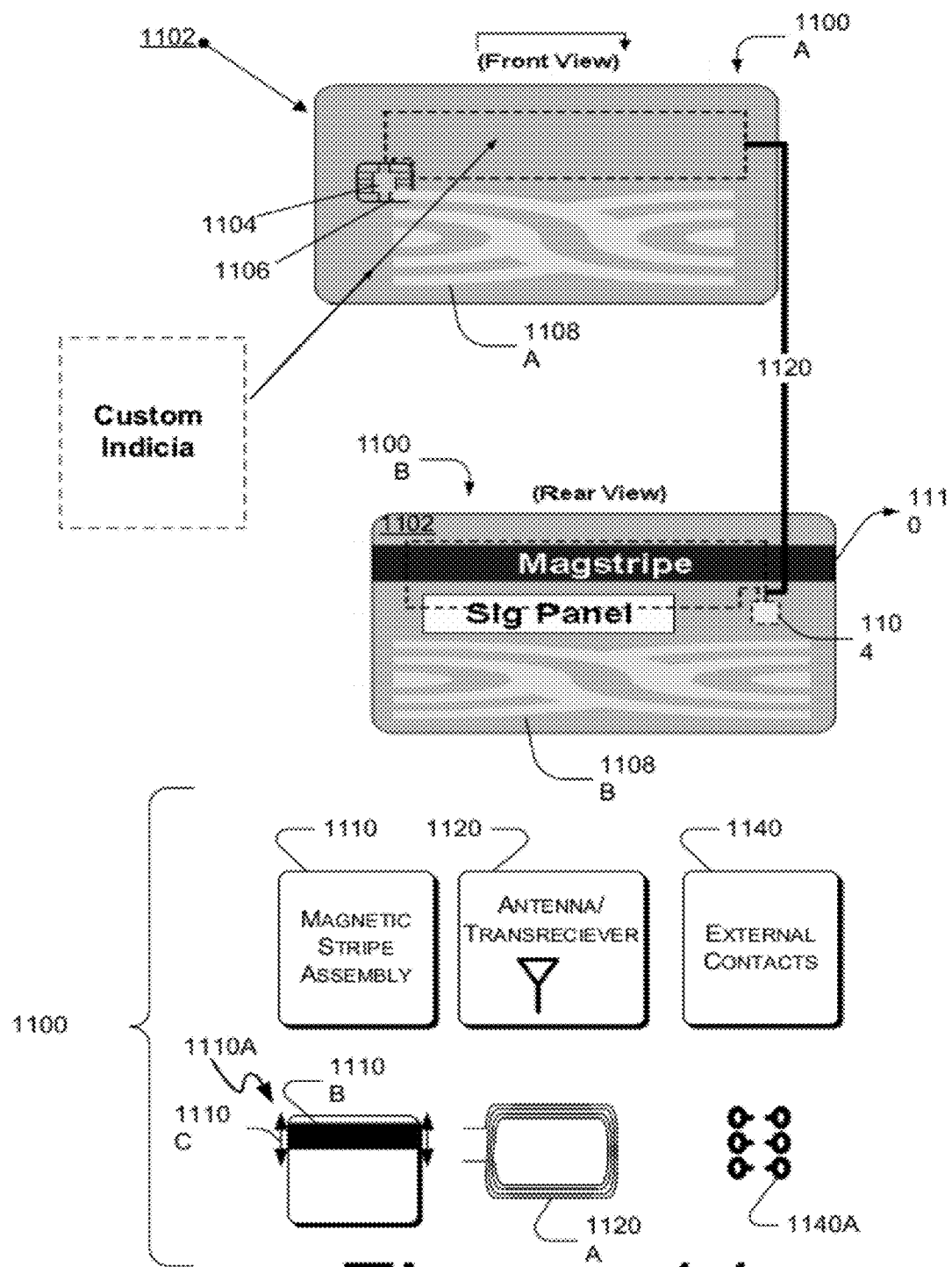
FIG. 11 illustrates exemplary implementations of a Contactless Consumer Portable Transaction Payment Device (CCPTPD).

FIG. 11 illustrates an exemplary implementation of a Contactless Consumer Portable Transaction Payment Device (CCPTPD) as described above, and shows front and rear views (1100A, 1100B). Images may be displayed on both sides of the CCPTPD 1102, with an image 1108A on the front view 1100A being either the same as or different from an image 1108B on the rear view 1100B. In this illustration, the front view 1100A can also display custom indicia.

FIG. 11 also shows exemplary implementations of a data encoding area of the CCPTPD 1102. The data encoding area may include an optional shielding element, which allows desired electromagnetic, optical, or radiative signals to penetrate while protecting the data encoding area from physical abuse or damage. The CCPTPD 1102 may optionally have areas outside of the data encoding area shielded from physical abuse or otherwise acceptable forms of electromagnetic radiation. Some of the acceptable signals that are allowed to penetrate the shielding and may include, but are not limited to, signals accompanying a magnetic field, RFID signals, IrDA signals, visible light, invisible light, modulated laser, and/or modulated RF communication signals. By way of example and not by way of limitation, a selective shielding element may comprise a clear plastic shield, conformal coatings, an opaque plastic shield, or a clear thin film, depending on the implementation of the data encoding area.

Non-limiting examples of the data encoding area are shown at reference numeral 1100, and include an antenna and/or transceiver 1120 for conduct financial transactions contactlessly. Also in FIG. 11 is an exemplary implementation of the data encoding area shown as an antenna and/or transceiver 1120. The antenna 1120 may include commonly used loop inductors such as the one shown 1120A or in those shown in related ISO standards for RF-readable smart cards. With such an interface, account data may be translated, modulated and transmitted in a manner acceptable by an RF contactless merchant POS terminal, a 802.11 Wi-Fi or WiMax network, or by a cellular or RF communications network.

Optionally, CCPRPD 1102 may also include a magnetic stripe assembly 1110 and electrical contacts 1140, The magnetic stripe assembly 1110 may comprise, in one implementation 1110A, a reprogrammable magnetic stripe 1110B that accepts data and/or commands from a processor and formats and renders that data into a form on a magnetic stripe that is readable by conventional merchant magnetic stripe-reading point of sale (POS) terminals. In this manner, the processor may program a particular account for use in a transaction as a function of user input selecting the account. Alternatively, the processor may erase the magnetic stripe of the assembly 1110, rendering the card useless in the event of its loss or theft. In one implementation shown 1110A, the magnetic stripe assembly 1110B at least partially slidably moves 1110C into and out of an assembly of the CCPTPD 1102 (partial view shown), allowing the CCPTPD 1102 to conduct a financial transaction at a point of sale terminal that includes a magnetic stripe reader.

External contacts 1140 are yet another alternative implementation of the data encoding area shown in FIG. 11. With the CCPTPD 1102 possessing physical contacts such as an array of conductive pads or shapes 1140A, the CCPTPD may be placed in physical contact with a merchant's POS, and the external contacts 1140 may establish connectivity to the merchant's financial processing system. The processor may relay account-related information to the merchant POS terminal through the contact interface, thereby allowing the CCPTPD 1102 to be utilized with the large number of preexisting merchant POS terminals.

Various terms may be used herein, which are to be understood according to the following descriptions 1 through 8:

1. Acceptance point device includes a device capable of communicating with a payment device, where the acceptance point device can include a Point of Device (POS) device, a smartcard, a payment card such as a credit or debit card with a magnetic strip and without a microprocessor, a keychain device such as the SPEEDPASS® commercially available from ExxonMobil® Corporation, a cellular phone, personal digital assistant (PDA), a pager, a security card, an access card, a smart media, a transponder, personal computer (PC), tablet PC, handheld specialized reader, set-top box, electronic cash register (ECR), automated teller machine (ATM), virtual cash register (VCR), kiosk, security system, or access system;
2. Account holder or user includes any person or entity with an account and/or a payment device associated with an account, where the account is within a payment system;
3. Issuer includes any entity that issues one or more accounts and/or payment devices;
4. Merchant includes any entity that supports an acceptance point device;
5. Participant includes any user, person, entity, charitable organization, machine, hardware, software, merchant or business who accesses and uses the system of the invention, such as any consumer (such as primary member and supplementary member of an aggregate consumer account), retailer, manufacturer, and third-party provider, and any subset, group or combination thereof;
6. Redemption includes obtaining a reward using any portion of points, coupons, cash, foreign currency, gift, negotiable instruments, or securities;
7. Reward includes any discount, credit, good, service, package, event, experience (such as wine tasting, dining, travel), or any other item; and
8. Payment device includes a card, smartcard, ordinary credit or debit cards (with a magnetic strip and without a microprocessor), a keychain device (such as the SPEEDPASS™ commercially available from Exxon-Mobil Corporation), cellular phone, personal digital assistant (PDA), pager, payment card, security card, access card, smart media, or transponder, where each payment device can include a loyalty module with a computer chip with dedicated hardware, software, embedded software, or any combination thereof that is used to perform actions associated with a loyalty program.

It is to be understood that this invention is not limited to the particular methodologies, systems and materials described, as these may vary. It is also to be understood that the terminology used in the description is for the purpose of describing the particular versions or implementations only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to a "transaction" is a reference to not only a financial transaction, such as between a merchant and a consumer, but any other exchange of value, data or information between one or more persons, entities, accounts or locations. Unless expressly stated otherwise, all undefined technical and scientific terms used herein have the same meanings as commonly understood by one of ordinary skill in the art, while all defined technical and scientific terms shall be deemed to include the same meaning as commonly understood by one of ordinary skill in the art with the stated definition. Although any methods, materials, and devices similar or equivalent to those described herein can be used in the practice or testing of implementations of the invention, the preferred methods, materials, and devices are now described. All publications mentioned herein are incorporated by reference. Nothing herein is to be construed as an admission that the invention is not entitled to antedate such disclosure by virtue of prior invention.

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed implementations is provided to enable any person of ordinary skill in the art to make or use the disclosure. Various modifications to these implementations will be readily apparent to those of ordinary skill in the art, and the generic principles defined herein may be applied to other implementations without departing from the spirit or scope of the disclosure. Thus, the disclosure is not intended to be limited to the implementations shown herein but is to be accorded the widest scope consistent with the principles and novel features disclosed herein.

What is claimed is:

1. A method comprising a plurality of steps each being performed by hardware executing software, wherein the steps include:
   reading an identifier corresponding to an application context and a requested signature from a token corresponding to an account on which a transaction is being conducted with a merchant by an account holder of the account;
   deriving, using at least the identifier corresponding to the application context, an issuer of the account from a plurality of said issuers;
   sending an authorization request message for the transaction for delivery to the issuer of the account, wherein the authorization request message includes the requested signature and an identifier for the account;
   receiving, from the issuer of the account in response to the authorization request message, an authorization response message that includes an indicator that the issuer of the account has verified the requested signature; and
   conducting, after receiving the indicator that the issuer of the account has verified the requested signature, the transaction on the account.

2. The method as defined in claim 1, wherein the authorization request message further comprises a currency amount of the transaction.

3. The method as defined in claim 1, wherein the steps further comprise, prior to the sending of the request for the signature from the token:
   sending an authentication request for delivery to a user of the token;
   receiving, in response to the request for the authentication request to the user, a user authentication response; and
   authenticating the user using at least the user authentication response.

4. The method as defined in claim 1, wherein the token is application software residing on an electronic device selected from the group consisting of:
   a smartcard that can be used to conduct by the account holder to conduct other said transaction on the account with other said merchants;
   a removable storage device in communication with a client from which the identifier is read; and
   a computing apparatus.

5. The method as defined in claim 1, wherein the token comprises a unique token identifier and a cryptographic key each of which are a Globally Unique Identifier (GUID), respectively, distinguishing same from other said unique token identifiers and other said cryptographic keys.

6. The method as defined in claim 1, wherein the token comprises data received from an input device in communication with a POS for the merchant.

7. The method as defined in claim 6, wherein the input device is selected from the group consisting of a numeric pin pad, an alphanumeric keyboard, a biometric sensor, and combinations thereof.

8. A memory storage apparatus comprising the software which, when executed by the hardware, the hardware performs the steps of claim 1.

9. A Point of Service terminal (POS) having memory storage comprising the software which, when executed by the POS, the POS performs the steps of claim 1.

10. A method comprising a plurality of steps each being performed by a merchant's Point of Service terminal (POS) executing software, wherein the steps include:
    sending, from the POS for delivery to a client, a request for a signature from a token corresponding to an account on which a transaction is being conducted at the POS with the merchant by an account holder of the account;
    receiving, in response to the request for the signature, at the POS:
        the requested signature; and
        an identifier corresponding to an application context;
    sending, from the POS for delivery to an entity operating an issuer directory, a query that includes the identifier corresponding to an application context;
    receiving at the POS, from the entity operating the issuer directory in response to the query, the issuer of the account;

sending, from the POS for delivery to the issuer of the account, an authorization request message for the transaction that includes:
  the requested signature;
  an identifier for the account; and
  a request for information;
receiving, from the issuer of the account in response to the authorization request message, an authorization response message that includes:
  an indicator that the issuer of the account has verified the requested signature; and
  the requested information; and
conducting, after receiving the indicator that the issuer of the account has verified the requested signature, the transaction on the account at the POS using at least the requested information.

11. The method as defined in claim 10, wherein the authorization request message further comprises a currency amount of the transaction.

12. The method as defined in claim 10, wherein the steps further comprise, prior to the sending of the request for the signature from the token:
  sending, from the POS, an authentication request for delivery to a user of the client;
  receiving, in response to the request for the authentication request to the user, a user authentication response; and
  authenticating the user using at least the user authentication response.

13. The method as defined in claim 10, wherein the token is application software residing on an electronic device selected from the group consisting of:
  a smartcard that can be used to conduct by the account holder to conduct other said transaction on the account with other said merchants;
  a removable storage device in communication with a client from which the identifier is read; and
  a computing apparatus.

14. The method as defined in claim 10, wherein:
  the token comprises a unique token identifier and a cryptographic key; and
  both the unique token identifier and the cryptographic key are each a Globally Unique Identifier (GUID), respectively, distinguishing same from other said unique token identifiers and other said cryptographic keys.

15. The method as defined in claim 10, wherein the token comprises data received from an input device in communication with the client.

16. The method as defined in claim 15, wherein the input device is selected from the group consisting of a numeric pin pad, an alphanumeric keyboard, a biometric sensor, and combinations thereof.

17. A memory storage apparatus comprising the software which, when executed by the POS, the POS performs the steps of claim 10.

18. A method comprising a plurality of steps each being performed by hardware executing software, wherein the steps include:
  sending first data to an untrusted environment, for delivery to a client, wherein the first data includes a request for a signature from a token corresponding to an account on which a transaction is being conducted by a merchant on an account of an account holder;
  receiving first one or more transmissions from an untrusted environment and in response to the request for the signature, wherein the first one or more transmissions include:
    the requested signature;
    a public key of the token; and
    a token identifier;
  deriving, from at least the token identifier, an application context identifier;
  deriving, from at least the application context identifier, the issuer of the account;
  sending second data to an untrusted environment, for delivery to the issuer of the account, wherein the second data includes an authorization request message for the transaction that includes:
    the requested signature;
    the public key of the token;
    an identifier for the account; and
    a request for information;
  receiving second one or more transmissions from an untrusted environment from the issuer of the account and in response to the authorization request message, wherein the second one or more transmissions include an authorization response message that includes:
    an indicator that the requested signature has been verified by using the public key of the token; and
    the requested information; and
  conducting, after receiving the indicator that the issuer of the account has verified the requested signature, the transaction on the account using at least the requested information.

19. The method as defined in claim 18, wherein:
the steps further comprise, prior to the sending of the request for the signature from the token:
  sending, to an untrusted environment, an authentication request for delivery to a user of the client;
  receiving from an untrusted environment, in response to the request for the authentication request to the user, a user authentication response; and
  authenticating the user using at least the user authentication response;
wherein each said sending step and each said receiving steps is communicated over a network in an untrusted environment; and
wherein the token is application software residing on an electronic device selected from the group consisting of:
  a smartcard that can be used to conduct by the account holder to conduct other said transaction on the account with other said merchants;
  a removable storage device in communication with a client from which the identifier is read; and
  a computing apparatus;
and wherein the token further comprises a unique token identifier and a cryptographic key, wherein both the unique token identifier and the cryptographic key are each a Globally Unique Identifier (GUID), respectively, distinguishing same from other said unique token identifiers and other said cryptographic keys.

20. A memory storage apparatus comprising the software which when executed by the hardware, the hardware performs the steps of claim 18.

* * * * *